United States Patent [19]

Hill

[11] 3,744,523
[45] July 10, 1973

[54] FLUID PILOT VALVE

[76] Inventor: James C. Hill, 174 N. Euclid, Oak Park, Ill. 60301

[22] Filed: July 21, 1971

[21] Appl. No.: 164,664

[52] U.S. Cl. .......................................... 137/625.68
[51] Int. Cl. ............................................. F16k 11/06
[58] Field of Search ............................... 137/625.68

[56] References Cited
UNITED STATES PATENTS

| | | | |
|---|---|---|---|
| 3,076,476 | 2/1963 | Campbell | 137/625.68 |
| 2,979,080 | 4/1961 | Hewitt | 137/625.68 |
| 2,320,905 | 6/1943 | Bateholts | 137/625.68 |
| 2,645,450 | 7/1953 | Chessman | 137/625.68 |

*Primary Examiner*—Henry T. Klinksiek
*Attorney*—Carlton Hill, J. Arthur Gross et al.

[57] ABSTRACT

A spool valve including a housing having a cylindrical bore in which is carried a slidably mounted piston. Means are provided to move the piston back and forth within the cylinder to carry on the valve action. The housing has a supply inlet, a pair of work outlets and a pair of exhaust outlets symmetrically disposed about the supply inlet. The slidable piston has openings formed therein to provide communication links between the various inlets and outlets when the piston is properly aligned with such inlets and outlets. The housing has O rings positioned in recesses formed in the wall of the cylindrical bore, and the piston makes a sealing engagement with the O rings. The spacing between the openings in the piston and the spacing between the various inlets and outlets is dimensioned in such a way that the sliding action of the piston does not suddenly introduce a relatively high pressure against one of the O rings prior to the time when the O ring is covered and hence held in place by a solid portion of the piston.

1 Claim, 1 Drawing Figure

PATENTED JUL 10 1973 3,744,523
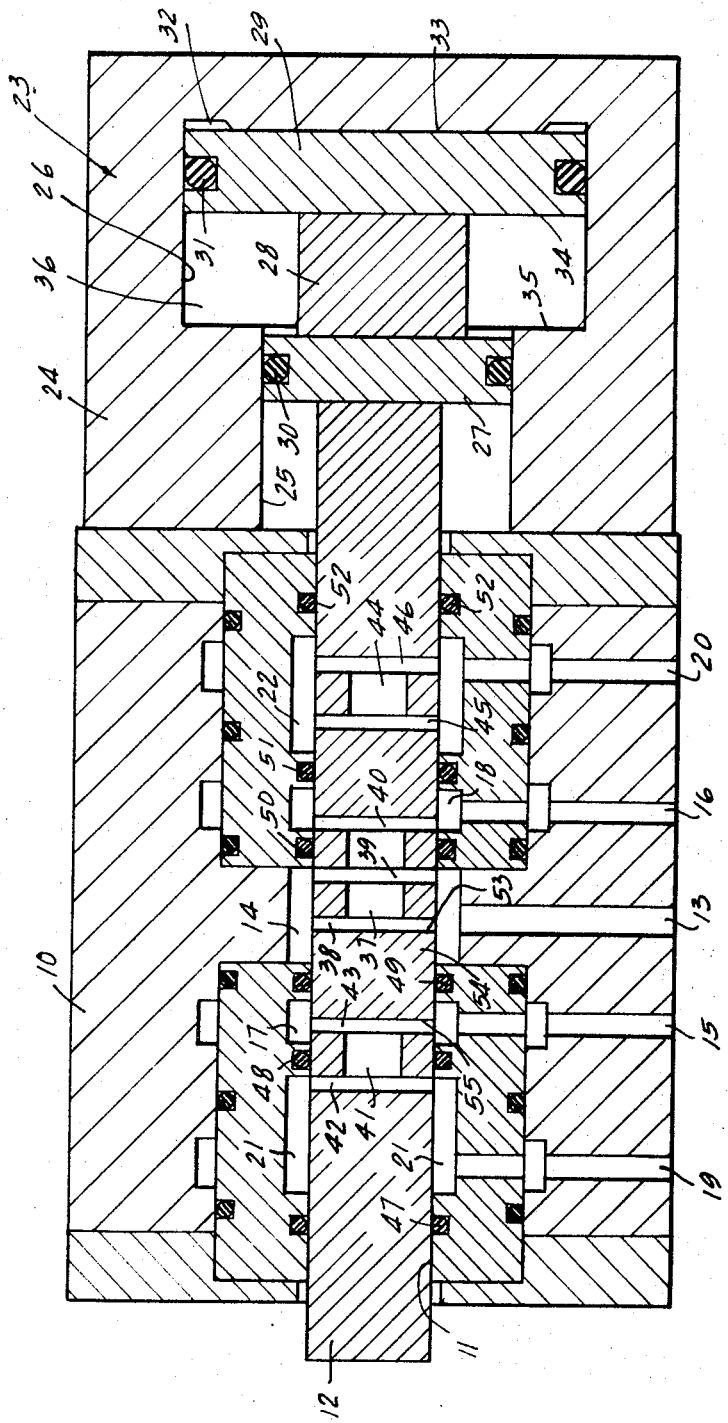
INVENTOR.
JAMES C. HILL

FLUID PILOT VALVE

BACKGROUND OF THE INVENTION

1. Description of the Prior Art

Spool valves with oscillating piston-like valve members are well known in the art. However, it has been found that in the operation of high pressure systems with rapidly shifting valve members, the introduction of a sudden high pressure on a seal such as an O ring often tends to lift the O ring out of its groove thereby allowing the sliding valve member to pinch or otherwise wear the O ring. The present invention eliminates such wear by assuring that a sudden high pressure is not applied to the O ring until a solid portion of the valve pistion is caused to overlie the O ring, thereby holding it in place in the valve body.

2. Field of the Invention

The field of art to which this invention pertains is spool valves which utilize resilient sealing means between the stationary valve housing and the slidable valve piston.

SUMMARY OF THE INVENTION

It is a principal feature of the present invention to provide an improved arrangement.

It is also a feature of the present invention to provide a spool valve system wherein sealing rings are not destroyed by the normal actuation of the valve.

It is a principal object of the present invention to provide a valve assembly utilizing a sliding piston as the valve operator and to arrange the solid portions of the piston in such a way that sealing rings associated therewith are not pinched, cut, or otherwise destroyed by the action of the valve in switching from one state to another.

It is a further object of the invention to provide a spool valve which includes a valve housing having a series of passageways leading into a cylindrical bore and wherein a piston is slidably mounted in the bore for co-acting with a series of O rings to provide a seal between certain of the passages and wherein means are provided to prevent excessive wear of the O rings.

It is another object of the present invention to provide a device as described above wherein means are provided to prevent the sudden application of a high pressure region to an O ring prior to the time when the spool or slidable piston is caused to overlie the O ring thereby assuring that the O ring will not be lifted out of position thereby protecting the ring from excessive abrasion from the sliding piston.

It is also an object of the present invention to provide a device as described above wherein the valve comprises a valve body having a high pressure supply inlet, a pair of work outlets, and a pair of related exhaust outlets so that the sliding action of the valve couples the high pressure supply alternately to the work outlets and couples the exhaust outlets to the work outlets inbetween the application of the high pressure thereto.

These and other objects, features and advantages of the invention will be readily apparent from the following description of a preferred embodiment thereof, taken in conjunction with the accompanying drawing, although variations and modifications may be effected without departing from the spirit and scope of the novel concepts of the disclosure.

BRIEF DESCRIPTION OF THE DRAWING

The single sheet of drawing in the present application shows a cross-section of a spool valve according to the present invention illustrating the spacing of the openings in the slidable piston which prevent the sudden application of a high pressure region to the sealing rings thereby avoiding excessive wear on the rings if the rings are forced out of position.

DESCRIPTION OF THE PREFERRED EMBODIMENT

The present invention relates to a spool type valve which includes a housing having a cylindrical bore formed along the length thereof and a piston slidably carried within the bore. The housing has a relatively high pressure supply inlet centrally located therein, and a pair of work outlets are formed on either side of the supply inlet. The work outlets carry high pressure fluid from the supply inlet to any mechanism which is operable by a high fluid pressure. Exhaust outlets are located adjacent to each of the work outlets, and the slidable piston or spool is formed in such a way that by repositioning the piston, the work outlets may either be communicated with the high pressure supply inlet or with the exhaust.

In prior art arrangements, the sealing rings associated with a valve of this type have been subject to excessive wear, since high pressure applied to the sealing rings could tend to lift the rings out of their respective slots. Once the ring is so raised, the rapidly moving piston tends to snip or cut the ring or simply produce excessive wear at the surface of the ring, thereby reducing the sealing capability of the system. Referring to the drawing in greater detail, a valve housing 10 is shown as having a cylindrical bore 11 formed longitudinally therein and a piston 12 slidably received in the bore.

A relatively high pressure supply inlet 13 is formed centrally within the bore and connects to a ring-like passageway 14 which surrounds the piston 12.

Also, a pair of work outlets 15 and 16 are provided at opposite sides of the supply inlet 13. The outlet 15 is coupled to a cylindrical passageway 17 which also surrounds the piston 12. Similarly, the outlet 16 is coupled to a cylindrical passageway 18 which also surrounds the piston 12.

In addition to the work outlets, a pair of exhaust outlets 19 and 20 are formed adjacent to the associated work outlets. The exhaust outlet 19 is coupled to a large cylindrical passageway 21, and the exhaust outlet 20 is coupled to a similar large cylindrical passageway 22.

The purpose of the valve mechanism is to alternately couple pressure and exhaust to the work outlets 15 and 16. For instance, in one position, the outlet 15 may be coupled to the supply 13, and hence high pressure fluid from the supply will pass through the work outlet to an operator for performing a specified function. After the function is performed, it may then be desired to couple exhaust to the work outlet and cease the coupling of the high pressure supply thereto. The result is that the high pressure initially applied to the work outlet is relieved through the exhaust outlet, and the operator which is coupled to the work outlet is allowed to assume its non-energized position.

The operation of the work outlet 16 is similar to that described in connection with the work outlet 15. The outlet 16 may be coupled to the pressure supply 13 or to the exhaust outlet 20 depending upon the desired status of the operator which is coupled to the work outlet 16.

The opening and closing of the respective inlets and outlets is accomplished by the slidable action of the piston 12. Accordingly, the opening and closing of the work outlet 15 is not independent of the opening and closing of the work outlet 16. Rather the piston is designed in such a way that when the work outlet 15 is coupled to pressure, the work outlet 16 is coupled to exhaust. Hence, the outlets 15 and 16 are alternately coupled to the pressure supply and exhaust and this is done in an alternate manner. The entire function just described is accomplished by a single slidable action of the piston 12.

The piston 12 is moved within the housing 10 through the use of an assembly 23 which is secured to the housing 10. The assembly 23 includes a housing 24 having a first bore 25 and a second larger bore 26. The piston 12 has an enlarged diameter portion 27, an intermediate shaft portion 28 and a further enlarged diameter portion 29 associated therewith. The enlarged portions 27 and 29 have O rings 30 and 31 associated therewith to act as seals. When it is desired to move the piston 12 to the left, a high pressure fluid may be introduced into a region 32. This high pressure fluid then acts on the surface 33 of the enlarged portion 29 to move the entire assembly to the left until the surface 34 contacts the abutting wall 35 of the housing 24. When it is desired to move the piston 12 to the right, high pressure fluid may be introduced into the region 36. It is noted that the piston 12 is shown in the extreme right position.

The piston 12 is provided with a central opening which consists of a longitudinally bore 37 and a series of transverse bores 38, 39 and 40.

As shown, when the piston 12 is in the far right position, the cylindrical passageway 14 associated with the supply inlet 13 is communicated through the openings 37, 38, 39 and 40 to the cylindrical passageway 18 associated with the work outlet 16. At the same time, the supply inlet 13 is blocked from communication with the other work outlet 15.

While the pressure supply inlet 13 is communicated with the work outlet 16, the exhaust outlet 20 is blocked from the work outlet 16. However, the exhaust outlet 19 is communicated with the work outlet 15 by an opening in the piston 12 which includes a first bore 41 which is formed longitudinally in the piston and second and third bores 42 and 43 which are formed transversely of the piston. A similar opening is associated with the exhaust outlet 20 and includes a longitudinal bore 44 and a pair of transverse bores 45 and 46. In the position shown, the opening 44, 45 and 46 plays no function and does not communicate the exhaust outlet 20 with any other passageway.

However, when the piston 12 is moved to the far left, the central opening in the piston 12, namely the opening 37, 38, 39 and 40 is moved to the left so that the pressure inlet 13 is in communication with the work outlet 15, and the exhaust outlet 19 is not in communication with either one of the passages.

At the other side of the valve, when the piston 12 is moved to the left, the opening 44, 45 and 46 will be in communication between the work outlet 16 and the exhaust outlet 20. Hence, by moving the piston back and forth within its cylinder, the supply inlet 13 is alternately coupled to the work outlets 15 and 16, and the exhaust outlets are alternately coupled to the work outlets 15 and 16. Furthermore, the coupling to either set of work and exhaust outlets is accomplished in an alternate manner.

A series of sealing rings which may be resilient O rings such as the rings 47, 48, 49, 50, 51 and 52 are positioned in recesses which are formed within the cylinder as shown. Each one of these rings is positioned so as to prevent the leakage of high pressure fluid past that point. For instance, the ring 48 is positioned between the work outlet 15 and the exhaust outlet 19; the ring 49 is positioned between the work outlet 15 and the supply inlet 13; the ring 50 is between the inlet 13 and the outlet 16; and the ring 51 is between the work outlet 16 and the exhaust outlet 20.

In the position shown, the O ring 48 is exposed to exhaust pressure since the exhaust outlet 19 is communicated from the cylindrical passageway 21 through the openings in the shaft 12 to the work outlet 15. However, as the piston moves to the left, the O ring 48 will be exposed to high pressure fluid as soon as the surface 53 of a solid portion 54 of the shaft moves past the O ring 49. Once the surface 53 moves to the left of the O ring 49, pressure from the supply inlet 13 will be communicated to the work outlet 15 and hence to the O ring 48. If the pressure from the supply inlet 13 is applied to the O ring 48 prior to the time the opposite surface 55 of the solid portion 54 of the piston 12 passes over the O ring 48, this application of high pressure may tend to lift the O ring 48 out of its respective slot in the housing. If the O ring 48 is lifted from its seated position, the surface 55 may clip, snip or otherwise abrade the O ring and destroy the seal.

According to the present invention therefore the distance between the surface 55 and the surface 53 of the solid portion 54 is of such a length as to assure that the surface 53 will not pass the O ring 49 until the surface 55 has been caused to overlie the O ring 48. Therefore, the O ring 48 will be covered by the solid portion 54 prior to the time that high pressure from the inlet 13 is released to the outlet 15. This dimensioning of the respective distances between the indicated passageways and the solid portions of the piston prevents the excessive wear of the respective O rings which would be caused by the lifting of the O ring out of its seated position. It should be understood that the shaft 12 may move very quickly and in fact may switch from a far right to a far left position and only in several ms.

The same application of dimensioning of the parts may be applied to the other O rings in the valve and may be understood readily from the drawing by the application of the same teaching to symmetrical parts of the valve. It will be apparent to those skilled in the art that various modifications of the features of this invention may be accomplished without departing from the spirit and scope of the invention as defined in the attached claim.

I claim as my invention:

1. A spool valve comprising: a stationary valve housing having a cylinder formed therein; a supply inlet, a work outlet and an exhaust outlet formed within said stationary valve housing and communicating with said cylinder at spaced apart points along the length thereof, a number of sealing means positioned at the inner surface of said cylinder, at least one of said sealing means being disposed between said supply inlet and said work outlet and at least one other of said sealing means being disposed between said work outlet and said exhaust outlet, a piston slidably carried within said cylinder and having an outer surface thereof coacting with said sealing means to provide a seal therewith, at least two passages formed within said piston, one of said passages being dimensioned so as to provide a communication link from said supply inlet to said work outlet when aligned therewith, the other of said passages being dimensioned so as to provide a communication link from said work outlet to said exhaust outlet when aligned therewith, means for sliding said piston in said cylinder to cause said passages to alternately align with said associated inlet and outlets, the spacing between said passages in said piston being dimensioned so that the region around any sealing member is prevented from being shifted from a relative low pressure to a relatively high pressure until the coacting outer surface of said piston substantially covers said sealing member, said spacing being for the dimensioned so that the work outlet is sealed from the supply inlet during the shifting action of the valve prior to the opening of said work outlet to said exhaust outlet, whereby said sealing members are prevented from damage due to the shifting of said slidable piston.

* * * * *